(12) United States Patent
Wu et al.

(10) Patent No.: US 6,748,533 B1
(45) Date of Patent: Jun. 8, 2004

(54) METHOD AND APPARATUS FOR PROTECTING THE LEGITIMACY OF AN ARTICLE

(75) Inventors: Jiankang Wu, Singapore (SG); Qibin Sun, Singapore (SG); Huijie Robert Deng, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/445,140

(22) PCT Filed: Jan. 30, 1999

(86) PCT No.: PCT/SG98/00108

§ 371 (c)(1),
(2), (4) Date: Dec. 2, 1999

(87) PCT Pub. No.: WO00/39953

PCT Pub. Date: Jul. 6, 2000

(51) Int. Cl.[7] .............................. H04L 9/00; G06K 9/00; G06K 9/36
(52) U.S. Cl. .................... 713/176; 713/177; 713/178; 713/179; 713/186; 382/115; 382/232; 382/250
(58) Field of Search ................................ 713/176, 177, 713/178, 179, 186; 382/115, 232, 250

(56) References Cited

U.S. PATENT DOCUMENTS

| | | | | |
|---|---|---|---|---|
| 4,529,870 A | * | 7/1985 | Chaum ..................... 235/380 |
| 4,972,476 A | * | 11/1990 | Nathans ..................... 713/186 |
| 4,993,068 A | * | 2/1991 | Piosenka et al. ............ 713/186 |
| 5,176,405 A | | 1/1993 | Kaule et al. .................. 283/83 |
| 5,354,097 A | | 10/1994 | Tel ............................... 283/72 |
| 5,488,664 A | | 1/1996 | Shamir ......................... 380/54 |
| 5,582,103 A | | 12/1996 | Tanaka et al. ................ 101/32 |
| 5,606,609 A | | 2/1997 | Houser et al. ................. 380/4 |
| 5,615,277 A | | 3/1997 | Hoffman ..................... 382/115 |
| 5,659,726 A | | 8/1997 | Sandford, II et al. ....... 395/612 |
| 5,664,018 A | | 9/1997 | Leighton ...................... 380/54 |
| 5,664,058 A | | 9/1997 | Vysotsky ..................... 704/243 |
| 5,680,460 A | | 10/1997 | Tomko et al. ................. 380/23 |
| 5,687,236 A | | 11/1997 | Moskowitz et al. .......... 380/28 |
| 5,695,220 A | | 12/1997 | Phillips ......................... 283/91 |
| 5,704,651 A | | 1/1998 | Phillips ......................... 283/93 |

(List continued on next page.)

OTHER PUBLICATIONS

Jian, K. Anil "Fundamentals of digital image processing." Prentice Hall, pp 342–425 (1986).

Cox, I.J., et al. "Secure Spread Spectrum Watermarking for Multimedia." IEEE Trans. on Image Processing 6, 12, 1673–1687 pp. 1–31 (1997).

Schneier, Bruce "Applied cryptography: protocols, " Algorithms, and source code in C. John Wiley & Sons, Inc. pp. 461–500 (1996).

Primary Examiner—Matthew Smithers
Assistant Examiner—Courtney D. Fields
(74) Attorney, Agent, or Firm—Ladas & Parry

(57) ABSTRACT

A method, an apparatus and a computer program product are disclosed for protecting the legitimacy of an article (100), and in particular an electronic document, against forgery or fraud. Such articles include passports, credit cards, bank notes, lottery tickets, secure forms. The method includes the following steps: several watermarks (204, 224, 244) are generated independently (304, 306, 308) by different cryptographic watermarking mechanisms controlled utilising information permanently associated within the article or product (100); and each watermark is embedded in a linked cryptographic manner (160, 162, 164). Subsequently, the watermarks can be scanned and digitised (410). The authenticity of the article (100) can be determined by verifying the correctness of extracted watermarks and the encryption links (160, 162, 164) among them. Also disclosed is a method of embedding an invisible watermark (714) in an official seal (712) incorporated in an electronic article or document (700).

84 Claims, 7 Drawing Sheets

U.S. PATENT DOCUMENTS

| | | | |
|---|---|---|---|
| 5,712,912 A | 1/1998 | Tomko et al. | 380/23 |
| 5,719,939 A | 2/1998 | Tel | 380/23 |
| 5,719,950 A | 2/1998 | Osten et al. | 382/115 |
| 5,721,788 A | 2/1998 | Powell et al. | 382/100 |
| 5,734,752 A | 3/1998 | Knox | 382/212 |
| 5,742,685 A * | 4/1998 | Berson et al. | 713/186 |
| 5,748,763 A | 5/1998 | Rhoads | 382/115 |
| 5,841,886 A * | 11/1998 | Rhoads | 382/115 |
| 6,389,151 B1 * | 5/2002 | Carr et al. | 382/100 |

* cited by examiner

METHOD AND APPARATUS FOR PROTECTING THE LEGITIMACY OF AN ARTICLE

FIELD OF THE INVENTION

The present invention relates to systems for protecting the legitimacy of an article and in particular to systems for verifying the authenticity of an electronic document or article against forgery.

BACKGROUND

Verifying the authenticity of a document or article is a well-known problem that is made increasingly more difficult with the widespread use of sophisticated reproduction technologies. This is particularly the case in relation to digital media. Sophisticated reproduction systems are readily available. Even home computer systems are capable of performing reproduction functions that until not very long ago were only capable of being performed by large institutions, such as government agencies and large corporations, due to the resources that were required. Thus, technology capable of facilitating the counterfeiting or misuse of documents is widespread. Consequently, attempts have been made to provide methods and systems for verifying the authenticity of documents and articles such as identification cards against forgery or fraud.

U.S. Pat. No. 5,719,939 describes a system and method for verifying the legitimacy of a product against forgery. A pattern of overlying individual fibres is embedded in a transparent base material, so that the fibres form differing geometrical configurations. The fibres are capable of being optically scanned through a surface of the transparent base material. Subsequently, an inspector may scan the product and compare the obtained data with the stored data in an attempt to verify the authenticity of the product.

However, the security of the method disclosed in U.S. Pat. No. 5,719,939 is heavily dependent on the different geometrical configurations of the particular fibres. If the configurations are too simple, security cannot be guaranteed. On the other hand, if the configurations are too complex, the costs of the system increase significantly.

U.S. Pat. No. 5,742,685 discloses a method for verifying an identification card and recording a verification of the same. An image of a person whom the identification card is to identify is scanned to produce a digital signal associated with a text message. They are compressed, encrypted, and then coded as a two-dimensional barcode. The barcode is then printed on the back of the identification card. To verify the validity of the card, the barcode is scanned, decoded, decrypted, expanded and displayed. To perform verification, the resulting displayed image and text are compared with the corresponding information printed on the card.

While the method of U.S. Pat. No. 5,742,685 utilises a cryptographic connection between the printed image and the text on the one hand and the printed barcode on the other, there are several disadvantages of this method, relating to the practicability and complexity of the method. One such difficulty is how to compress an entire image to a size that satisfies the requirements of encryption and barcode encoding, while maintaining image quality. Significant compression can cause a significant degradation in the capacity to the recovered image with the original image. A further disadvantage is that a separate encryption/decryption key is required There is therefore a need for an improved technique of verifying the authenticity of an article, especially an electronic document.

SUMMARY

In accordance with a first aspect of the invention, a method of embedding linked watermarks in an article requiring protection against forgery is disclosed. The method includes the steps of: extracting information from a first portion of the article; encrypting the extracted information from the first portion; generating a watermark using the encrypted information; rendering the watermark to a second portion of the article; and repeating the extracting, encrypting, generating and rendering steps with another portion of the article until all relevant information of the article has been processed and a cryptographic link is formed thereby.

Preferably, the watermark is generated based on a selected watermark generating mechanism dependent upon the encrypted information. Further, each of the watermarks can be generated based on different watermark generation mechanism. Still more preferably, seeds for generating a watermark can be obtained from only one portion of the article or several selected portions of the article.

Preferably, the information is extracted directly from text and/or from one or more invariant features of an image. The image can depict biometric data of a person associated with the article.

Preferably, the article is an electronic document. It can also be a printed document.

In accordance with a second aspect of the invention, there is disclosed an apparatus for embedding linked watermarks in an article requiring protection against forgery. The apparatus includes: a device for extracting information from a first portion of the article; a device for encrypting the extracted information from the first portion; a device for generating a watermark using the encrypted information; a device for rendering the watermark to a second portion of the article; and a device for controlling repeated operation of the extracting, encrypting, generating and rendering devices with another portion of the article until all relevant information of the article has been processed and a cryptographic link is formed thereby.

In accordance with a third aspect of the invention, there is disclosed a computer program product having a computer readable medium having a computer program recorded therein for embedding linked watermarks in an article requiring protection against forgery, the computer program product including: a module for extracting information from a first portion of the article; a module for encrypting the extracted information from the first portion; a module for generating a watermark using the encrypted information; a module for rendering the watermark to a second portion of the article; and a module for controlling repeated operation of the extracting, encrypting, generating and rendering modules with another portion of the article until all relevant information of the article has been processed and a cryptographic link is formed thereby.

In accordance with a fourth aspect of the invention, there is disclosed an article requiring protection against forgery or fraud. The article includes: two or more portions for containing information, the information including text, biometric data, or both; two or more watermarks, each watermark printed in a respective one of the portions and being dependent upon information in a different portion, whereby a cryptographic link is formed between the two or more portions.

Preferably, the article is an electronic document. It can also be a printed document.

In accordance with a fifth aspect of the invention, there is disclosed an article requiring protection against forgery or fraud. The article is formed by the steps of: extracting information from a first portion of the article, the article having two or more portions for containing information, the information including text, biometric data, or both; encrypting the extracted information from the first portion; generating a watermark using the encrypted information; rendering the watermark to a second portion of the article; and repeating the extracting, encrypting, generating and rendering steps with another portion of the article until all relevant information of the article has been processed so that two or more watermarks are formed, each watermark being rendered in a respective one of the portions and being dependent upon information extracted from a different portion, whereby a cryptographic link is formed between the two or more portions.

In accordance with a sixth aspect of the invention, there is disclosed a method of forming an article requiring protection against forgery. The method includes the steps of: generating an invisible watermark dependent upon information contained in the article; and rendering the watermark within an official seal placed on the article, the official seal being a securely controlled item of an authority.

Preferably, the article is an electronic document. It can also be a printed document.

Preferably, the method includes the steps of: extracting information from a portion of the article; and encrypting the extracted information. The information can be extracted directly from text, or from one or more invariant features of an image. The image can depict biometric data of a person associated with the article.

In accordance with a seventh aspect of the invention, there is disclosed an apparatus for forming an article requiring protection against forgery. The apparatus includes: a device for generating an invisible watermark dependent upon information contained in the article; and a device for rendering the watermark within an official seal placed on the article, the official seal being a securely controlled item of an authority.

In accordance with an eighth aspect of the invention, there is disclosed a computer program product having a computer readable medium having a computer program recorded therein for forming an article requiring protection against forgery. The computer program product includes: a module for generating an invisible watermark dependent upon information contained in the article; and a module for rendering the watermark within an official seal placed on the article, the official seal being a securely controlled item of an authority.

In accordance with a ninth aspect of the invention, there is disclosed an article requiring protection against forgery or fraud. The article includes: a portion containing information, the information including text, biometric data, or both; an official seal placed on the article, the official seal being a securely controlled item of an authority; and an invisible watermark dependent upon the information and being rendered within the official seal.

Preferably, the article is an electronic document. It can also be a printed document.

In accordance with a tenth aspect of the invention, there is disclosed an article requiring protection against forgery or fraud. The article is formed by the steps of: generating an invisible watermark dependent upon information contained in the article, the information including text, biometric data, or both; and rendering the watermark within an official seal placed on the article, the official seal being a securely controlled item of an authority.

In accordance with an eleventh aspect of the invention, there is disclosed a method of verifying the legitimacy of an article against forgery. The method includes the steps of: inputting the article as two or more portions; extracting at least one watermark from each portion; determining a watermark from information in each portion; comparing the extracted watermark from one portion with the determined watermark from a different portion to determine if a corresponding cryptographic link is found; and repeating the comparing step until all portions of the article have been processed, the article being verified as a legitimate article if all cryptographic links are found between the two or more portions.

Preferably, the method includes the steps of: scanning the product; and dividing the scanned product into two or more portions. It can also include the step of scanning information from a portion of the product to reconstruct a seed to a generated watermark using a cryptographic technique carried out in a process of embedding a watermark in the portion. More preferably, the method includes the step of: extracting an invariant feature from the scanned information to reconstruct the seed. The extracted, invariant feature can include biometric data.

Preferably, the method also includes the step of decrypting the scanned information to reconstruct the seed. Optionally, a cryptographic link can be a self-circle, that is referring back to itself.

In accordance with a twelfth aspect of the invention, there is disclosed an apparatus for verifying the legitimacy of an article against forgery. The apparatus includes: a device for inputting the article as two or more portions; a device for extracting at least one watermark from each portion; a device for determining a watermark from information in each portion; a device for comparing the extracted watermark from one portion with the determined watermark from a different portion to determine if a corresponding cryptographic link is found; and a device for repeating the comparing step until all portions of the article have been processed, the article being verified as a legitimate article if all cryptographic links are found between the two or more portions.

In accordance with a thirteenth aspect of the invention, there is disclosed a computer program product having a computer readable medium having a computer program recorded therein for verifying the legitimacy of an article against forgery. The computer program product includes: a module for inputting the article as two or more portions; a module for extracting at least one watermark from each portion; a module for determining a watermark from information in each portion; a module for comparing the extracted watermark from one portion with the determined watermark from a different portion to determine if a corresponding cryptographic link is found; and a module for repeating the comparing step until all portions of the article have been processed, the article being verified as a legitimate article if all cryptographic links are found between the two or more portions.

In accordance with a fourteenth aspect of the invention, there is disclosed a method of verifying the legitimacy of an article against forgery. The method includes the steps of: extracting at least one invisible watermark from an official seal, the official seal being a securely controlled item of an authority; and comparing the extracted watermark with verification information to determined if the extracted watermark matches the verification information indicating that the article is legitimate.

Preferably, the verification information is information identifying the authority.

Preferably, the method includes the step of generating a watermark dependent upon information forming part of the article to provide the verification information. The information forming part of the article can be biometrics data.

Preferably, the method includes the step of decrypting the watermark.

In accordance with a fifteenth aspect of the invention, there is disclosed an apparatus for verifying the legitimacy of an article against forgery. The apparatus includes: a device for extracting at least one invisible watermark from an official seal, the official seal being a securely controlled item of an authority; and a device for comparing the extracted watermark with verification information to determined if the extracted watermark matches the verification information indicating that the article is legitimate.

In accordance with a sixteenth aspect of the invention, there is disclosed a computer program product having a computer readable medium having a computer program recorded therein for verifying the legitimacy of an article against forgery. The computer program product includes: a module for extracting at least one invisible watermark from an official seal, the official seal being a securely controlled item of an authority; and a module for comparing the extracted watermark with verification information to determined if the extracted watermark matches the verification information indicating that the article is legitimate.

BRIEF DESCRIPTION OF THE DRAWINGS

Embodiments of the invention are described hereinafter with reference to the drawings, in which.

DETAILED DESCRIPTION

Figure 1:
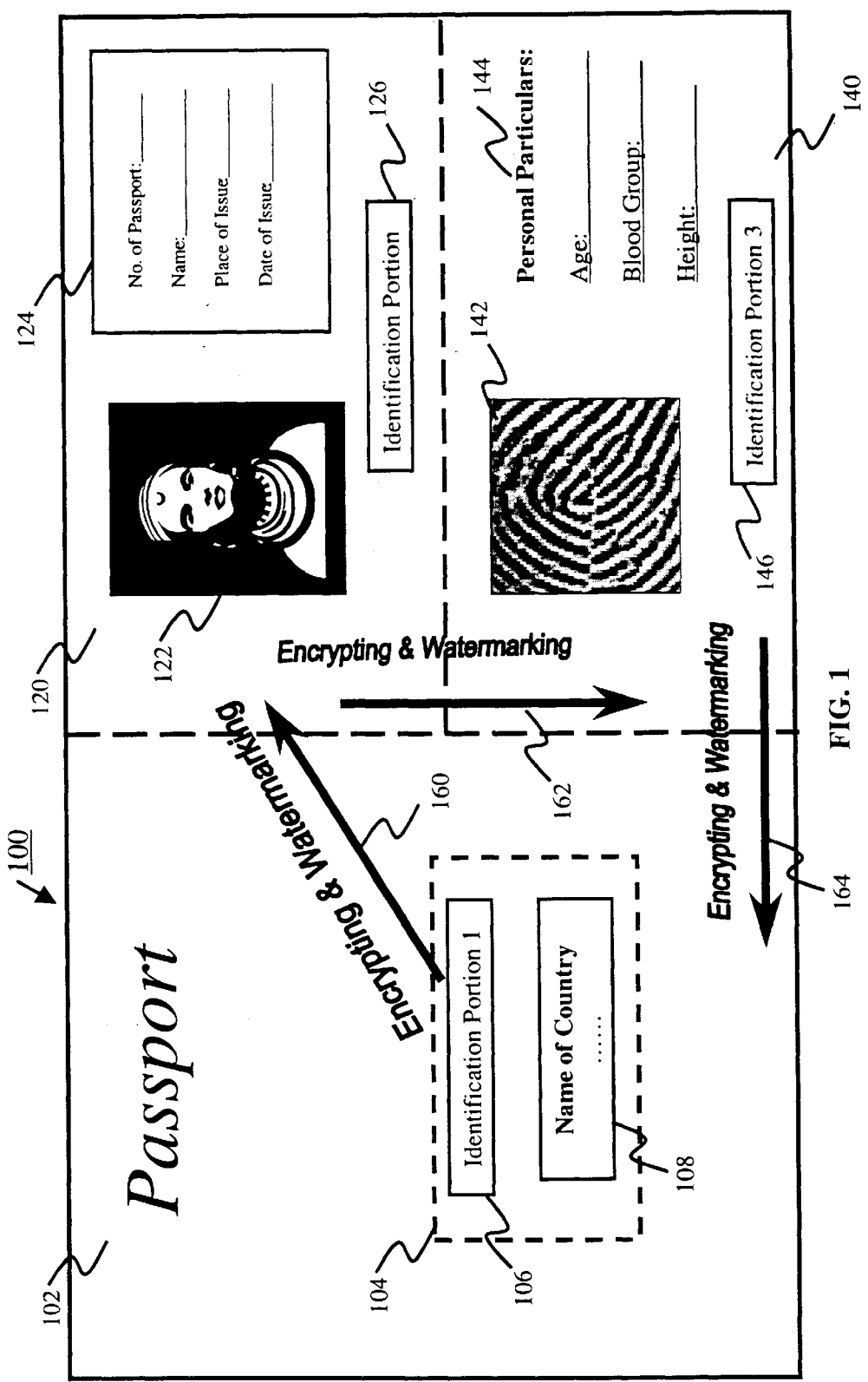
FIG. 1 is a block diagram illustrating an article according to the first embodiment of the invention.

A method, apparatus, and computer program product for verifying the authenticity of an electronic document or article are disclosed. Further, an improved electronic document is disclosed. In the following description of several embodiments, numerous specific details such as particular watermarking techniques are described in order to provide a more thorough description of those embodiments. It will be apparent, however, to one skilled in the art that the present invention may be practised without those specific details. In other instances, well-known features such as particular biometrics data, for example, have not been described in detail so as not to obscure the invention.

In broad terms, the embodiments of the invention provide a system for verifying the legitimacy of an electronic product against forgery or fraud. The embodiments of the invention can be used to verify the authenticity of articles formed from electronic data, including identification cards and other security related items. Other types of products that can be protected include passports, credit cards, personal identification cards, banknotes, checks or negotiable instruments, certificates, security forms, lottery tickets, and the like. Generally, the embodiments of the invention can be used in any electronic or physical documents relating to security.

In one embodiment, a watermark dependent upon the source electronic product is embedded in an electronic seal or stamp, which is incorporated in or embedded on the electronic product. This electronic "seal" or "stamp" is a controlled marking establishing the authority of the person verifying the electronic product's authenticity. For example, a notary public could embed their official electronic seal on an electronic document. The official seal is itself preferably visible. To ensure that tampering of the electronic document can be detected after the document is certified or endorsed with the stamp, an invisible watermark containing information about the authority. Alternatively, the invisible watermark can be dependent upon a portion of, portions of, or the entire document is embedded in the stamp. Thus, the authenticity of the document can be verified. In the latter case, subsequent changes to the document can be detected since the watermark in the seal will not match a watermark that is generated dependent upon the modified data.

In another embodiment, relevant information in portions of an electronic product are linked to other respective portions of the document in a cryptographic way based on invisible or visible watermarks. That is, information in a first portion of an electronic document, for example, is embedded as an invisible watermark in a second portion of the document. Information in the second portion is embedded as a watermark in a third portion. Likewise, information in the third portion can be embedded as a watermark in the first portion. Numerous other combinations and arrangements are possible.

Preferably, the product has a unique feature representation of a biometric characteristic of its owner (e.g. a facial image) printed on a first portion of the product. Using a facial recognition method, invariant features can be extracted from the first representation to form the second representation of biometric characteristics of the owner. The second representation is coded and encrypted as input for the first watermark generator. The first watermark generated (the third representation of a biometric characteristic of the owner) is printed onto a second portion of the product.

The second portion of the product may have also a first unique feature representation of another biometric characteristic of the owner, such as a picture of the person's fingerprint printed on the second portion. Using a fingerprint recognition method, invariant features can be extracted from the above first representation (i.e. fingerprint picture) to form the second representation of the biometric characteristic of the owner. The second representation is then coded and encrypted as input of a second watermark generator. The second watermark generated (the third representation of a biometric characteristic of the owner) is printed onto a third portion of the product. This process can be repeated any number of times in a similar fashion for other portions of the product. This process continues until a coded and encrypted representation from the last portion is printed on the first portion of the product.

A cryptographic link is thereby formed. The security of the product's authentication is increased not only by verifying it through traditional authentication means, but also by verifying the correctness of the formed cryptographic link. Preferably, the cryptographic link can be implemented in a self-circle way. That is, unique information is extracted from a portion, and a corresponding watermark is formed and embedded into the same portion to protect the portion from alteration.

Again, the first representation of biometric characteristic can be an image of the persons face or fingerprint. The second representation can be invariant extracted features of the first representation. The third representation is a watermark generated from the second representation.

Optionally, other information related to the product owner's identity, including the person's ID number, birth date, birthplace, and the like, is appended to the source of the representation at a different representation level. Still further information can be used related to whole operation, such as the embedding time and the embedding place, can be appended to the source of the representation in different portions of the product. Optionally, the verification can be done at different levels based on different requirements of particular applications.

First Embodiment

FIG. 1 is a block diagram depicting an article 100 containing security information in accordance with a first embodiment of the invention. The depicted exemplary article 100 is a passport. However, the article can be any of numerous products requiring protection against forgery, including a credit card, a bank note, a lottery ticket, a legal document, a driver's license, a birth certificate, etc. Forming linked cryptographic watermarks in several portions of the article increases the verifiable authenticity of the article 100 requiring protection against forgery or any other unauthorised modification.

The depicted passport 100 of FIG. 1 includes three regions, areas or portions 102, 120 and 140. For example, the portion 102 of the passport 100 is the cover of a passport, which normally is a separate sheet. The other portions 120 and 140 of the article or product 100 can be separate or overlapping parts of the same sheet, which is different from that of portion 102. Numerous other possibilities can be envisaged and will be readily apparent to those skilled in the art in view of the disclosure provided herein. In FIG. 1, the portions 120 and 140 do not overlap.

The first portion 102 of the passport 100 is marked with information 104 that can be used to watermark one or more other portions 120 and 140 of the article 100. The information 104 includes a first identification portion 106 and the name of the country or state 108 for which the passport is issued.

The second portion 120 of the passport 100 contains a person's photographor other depiction of their likeness 122, various pieces of data 124 about the passport and the person, and another identification portion 126. The various pieces of data 124 are typically associated with the person and include in this example the passport number, the name of the person, and both the place and date of issue of the passport.

The third portion of the passport 100 contains biometric data 142 such as the person's fingerprint, personal particulars 144 and a third identification portion 146. The personal particulars in this example include the person's age, blood group, and height.

In the article 100, one or more messages or pieces of information that are likely to be included in the article 100 (e.g. the passport) can be utilised to generate the linked watermarks or cryptographic link. Watermarking links formed in this manner significantly increase the security of the article or product 100 against undetected forgery. At the same time, the conventional means employed in the article 100 against forgery can be retained.

In the first portion 102 of the passport 100, the message to be extracted can be the "Name of Country" 108. The extracted message is encrypted. The encrypted message is then used to generate a first watermark based on the first selected watermark generating mechanism. In turn, the first watermark is printed or otherwise reproduced in at least the second portion 120. An arrow 160 extending from the first portion 102 to the second portions 120 of the passport 100 generally depicts this method in accordance with the first embodiment.

In the second portion 120 of the passport 100, the photograph or depiction 122 of the person can be used as information to generate a watermark for the third or first portions 140, 102. For example, a biometrics recognition engine can be used with the person's face contained in the image 122 to extract one or more invariant features of the person. One of the invariant features alone, or several invariant features combined, can be encrypted (for example, by hashing). The encrypted message is used to generate the second watermark based on a second selected watermark generating mechanism. The second generated watermark is rendered or printed onto the third portion 140 of the passport 100, where the person's fingerprint picture and associated messages are located. Another arrow 162 extending from the second portion 120 to the third portion 140 of the passport 100 generally depicts this process.

In turn, yet another biometric recognition engine can be used with the fingerprint 142 to extract its invariant features. Again, one of these invariant features alone or several invariant features combined can be encrypted (for example, by hashing) with the above messages. The encrypted message is used to generate a third watermark based on the third selected watermark generating mechanism. The third generated watermark is printed onto the first portion 102 of the article 100. In this manner, a cryptographic watermarking link is formed between the various portions 102, 120, 140 of the passport 100.

Figure 2:
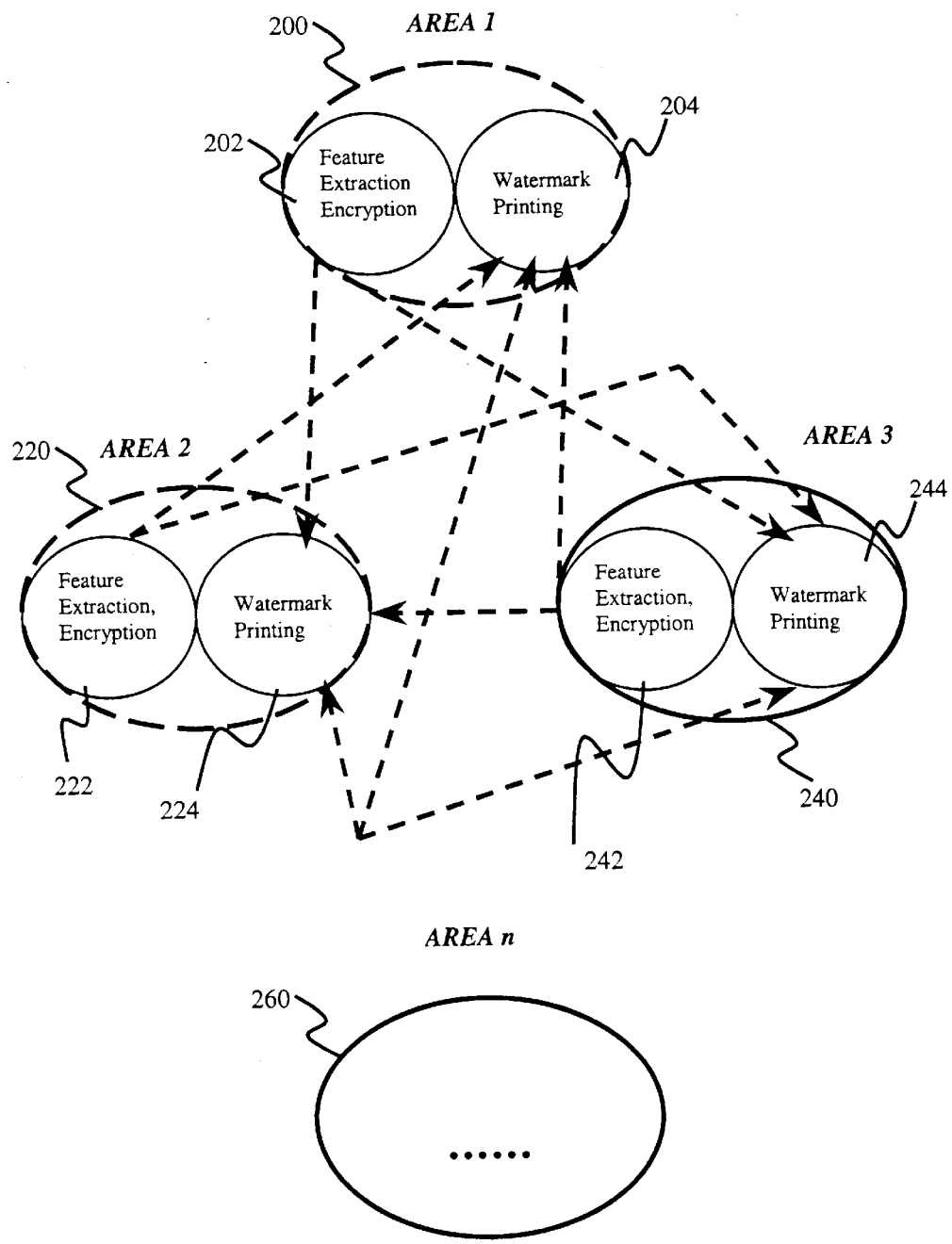
FIG. 2 is a symbolic diagram depicting the formation of a cryptographic watermark link in accordance with the first embodiment.

FIG. 2 provides a symbolic depiction of the method in accordance with the first embodiment. Various portions of an article requiring protection against forgery or unauthorised modification are depicted by dashed-line ovals 200, 220, 240 and 260, each of which is labelled area 1, area 2, area 3, . . . , area n. The number n may be dependent on the particular application of the method and can be selected by the user. Each area 200, 220, 240 is depicted containing a circle 202, 222, 242 representing extraction of a feature for the area and encryption of the extracted feature. The area 200, 220, 240 also contains another circle 204, 224, 244 depicting printing or rendering of a watermark from another area. The area 260 is meant to be a general depiction of another area and therefore its details are not shown. The dashed arrows extending between the areas 200, 220, 240, 260 indicate the relationship between features extracted and encrypted 202, 222, 242 from one area being used to print or render a watermark 204, 224, 244 of at least one other different area 200, 220, 240, 260.

With reference to the specific example of FIG. 1 and the more abstract depiction of FIG. 2, a process of authenticating an article embedded with linked watermarks according the first embodiment is explained. During the authentication process, portions of the article 100, for example, are scanned and digitised. Firstly, each portion 102, 120, 140 is checked to detect whether or not an embedded watermark is located in the relevant portion. If an embedded watermark is not detected in one or more of the portions 102, 120, 140, this result indicates that the article is a forgery. Furthermore, an extracted copy of the watermark detected in a portion under scrutiny is checked against a corresponding watermark, which is derived on the fly using a combined and encrypted message obtained from another relevant portion of the article. If the watermark rendered in the portion does not match the on-the-fly watermark, this indicates that the article is also a forgery. The foregoing authentication or verification process is carried out until all portions of the article 100 are checked. This method of verifying the legitimacy of an article against forgery or fraud does not affect any conventional or existing security features or means used in the article to protect against forgery.

Figure 3:
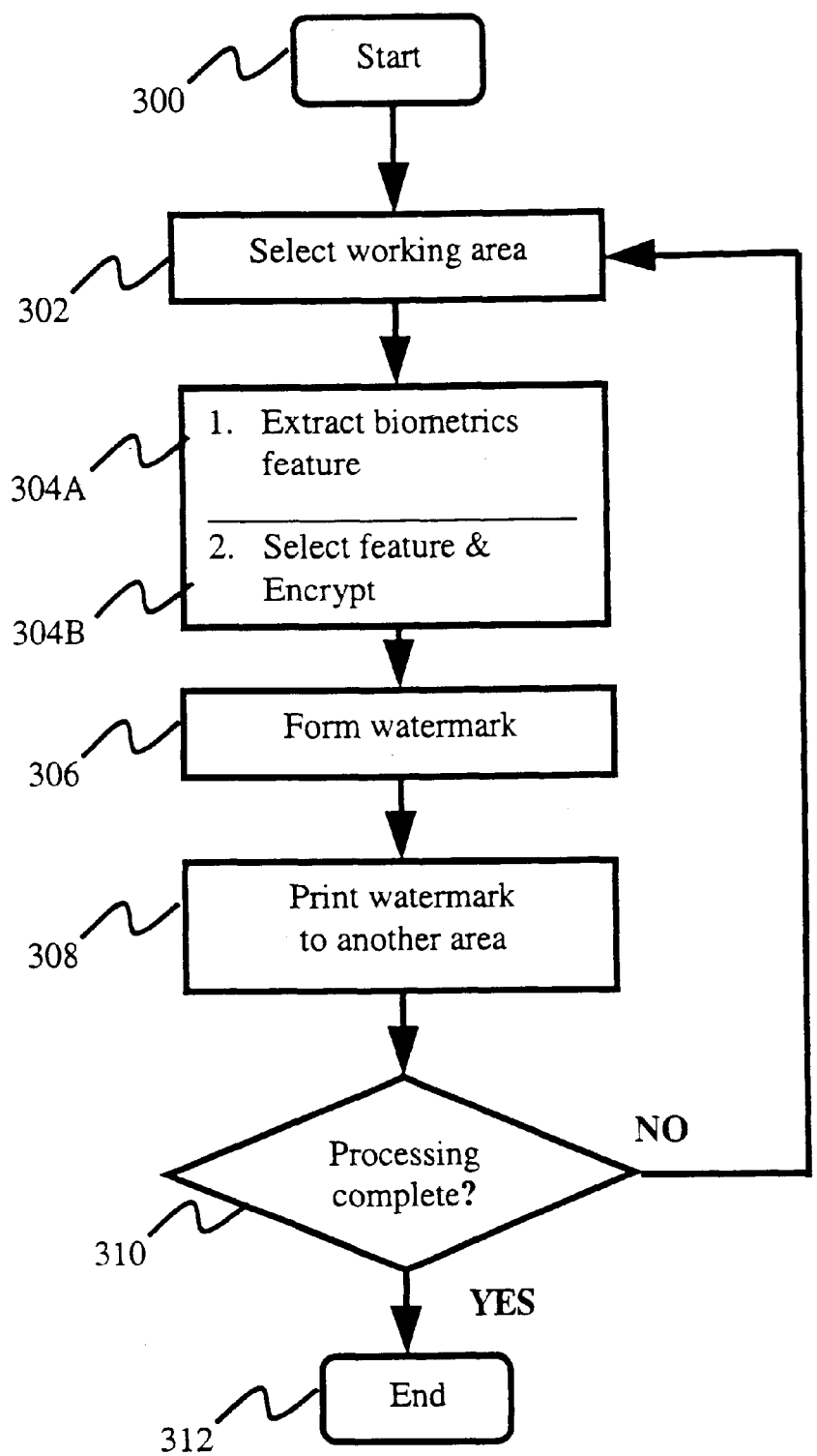
FIG. 3 is a flow diagram illustrating a method of forming and embedding watermarks in accordance with the first embodiment.

FIG. 3 is a flow diagram illustrating the method of forming and embedding linked watermarks in an article in accordance with the first embodiment of the invention. Processing commences in step 300. In step 302, a "working area" or portion of the article is selected for processing. For example, the first portion 102 of the passport 100 in FIG. 1 can be selected. In step 304, an encrypted message extracted from the portion is generated. In particular, sub-step 304A extracts a feature from the portion. Preferably, this involves extracting a biometrics feature. In sub-step 304B, one ore more extracted features are selected for encryption and encrypted. One skilled in the art will appreciate that the sub-steps 304A and 304B can be implemented as separate steps. In step 306, a watermark is formed or generated using the encrypted message. While step 306 as depicted in FIG. 3 only indicates that a watermark is formed, it will be appreciated from the disclosure herein that one or more watermark generation techniques can be employed. Preferably, different watermark generation techniques are utilised to generate each watermark in different "working areas". One method of forming a watermark is to produce a noise-like random pattern using the extracted message and combine the original content and the generated pattern under the condition that no change in the original document can be readily perceived by the HVS. An example of such a technique is disclosed by Cox, I J, Killan, J, Leighton, T and Shamoon, T, *Secure Spread Spectrum Watermarking for Multimedia*, Tech. Rep. 95-10, NEC Research Institute.

In step 308, the generated watermark is rendered or embedded into at least one other "working area". For example, the watermark derived from the portion 102 can be rendered or embedded in the second portion 120 of the article 100. In decision block 310, a check is made to determine if all portions of the article have been processed (i.e. is processing complete?). If decision block 310, returns false (NO), processing continues at step 302 and another portion of the article is selected as the "working area" for processing. Otherwise, if decision block 310 returns true (YES), processing terminates in step 312. Thus, the embedding method of the first embodiment is carried out until all working areas have been processed. The method produces a more secure article that can be better protected against undetected forgery or other unauthorised modification.

Figure 4:
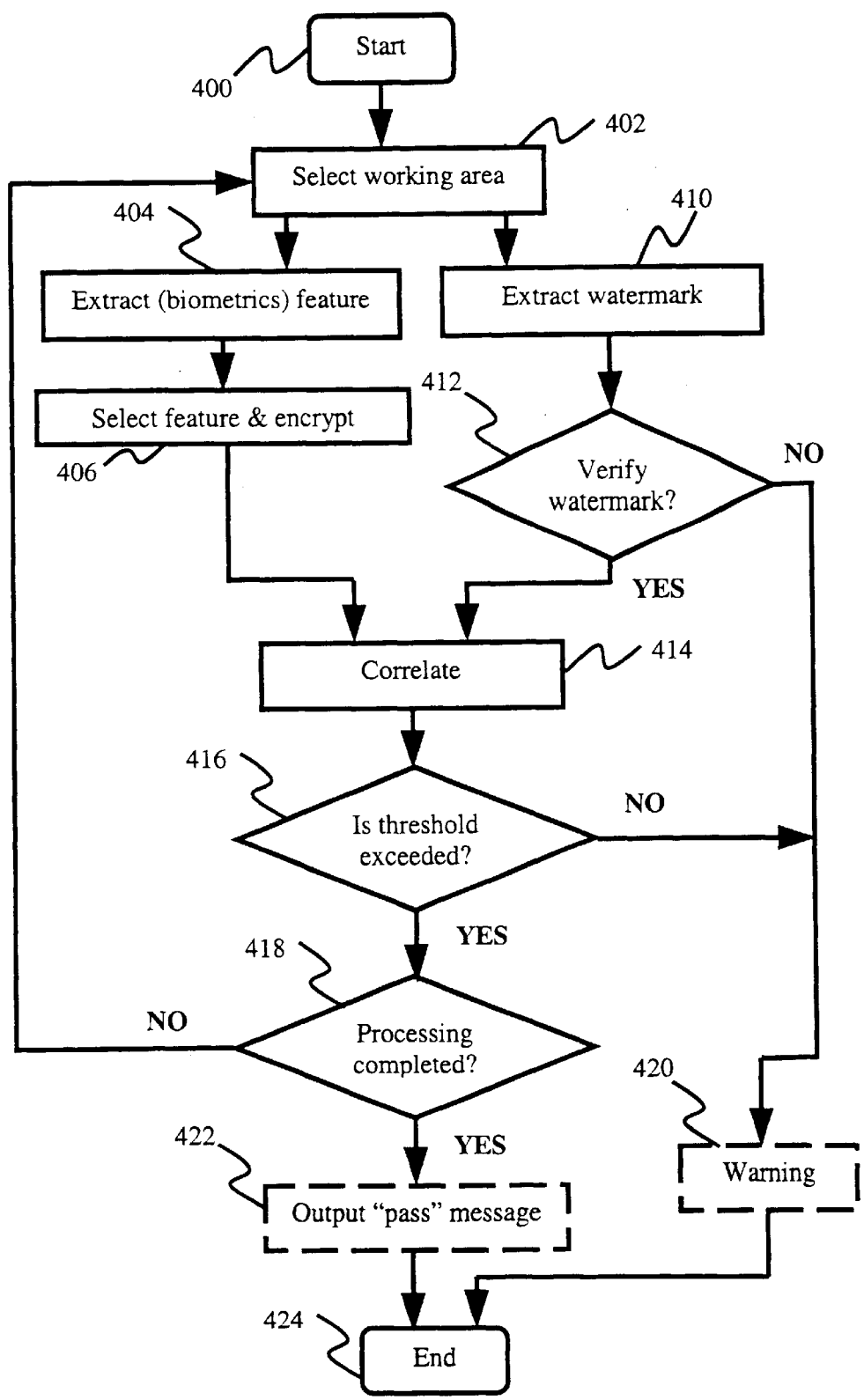
FIG. 4 is a flow diagram illustrating a method of authentication in accordance with the first embodiment.

FIG. 4 is a flow diagram of authenticating or verifying an article embedded with linked watermarks according the first embodiment. Processing commences in step 400. In step 402, a "working area" or portion of the article is selected for processing. Preferably, steps 404 and 406 on the one hand and steps 410 and 412 on the other are performed substantially in parallel as indicated graphically in FIG. 4 where the two groups of steps form parallel branches of operations following step 402. However, one skilled in the art will appreciate that this need not be the case, and the groups of steps can be carried out sequentially instead.

In step 410, a watermark is extracted from the "working area" selected in step 402. In decision block 412, a check is made to verify the watermark obtained in step 410. If decision block 412 returns false (NO), processing preferably continues at step 420, in which a warning message is issued, before processing terminates in step 424. Step 420 is indicated with dashed lines to show that the step is optional and different processing may be implemented or omitted altogether without departing from the scope and spirit of the invention. Otherwise, if decision block 412 returns true (YES), processing continues at step 414.

In step 404, one or more features are extracted from another working area, different from the one selected in step 402. The working area for step 404 is the portion of the article from which the watermark extracted from the selected working area in step 410 is derived. Preferably, a biometric feature(s) is extracted. In step 406, one extracted feature or a combination of features extracted from the working area of step 404 are selected and encrypted. Processing then continues at step 414.

In step 414, a correlation is carried out between the verified watermark extracted from the selected working area and the output of step 406. In decision block 416, a check is made to determine whether or not the correlation result exceeds a predefined threshold. If decision block 416 returns false (NO), this indicates that the article is a forgery. Processing then preferably continues at step 420, and a warning message is given before processing terminates in step 424. Otherwise, if decision block 416 returns true (YES), processing continues at decision block 418. In decision block 418, a check is made to determine if all working areas of the article 100 have been processed. If decision block 418 returns false (NO), processing continues at step 402 and another remaining working area is selected for processing. Otherwise, if the decision block 418 returns true (YES), processing preferably continues at optional step 422. In this manner, the authentication process is carried out until a selected working area fails or all working areas are processed. In step 422, a message that the article is authenticated or has "passed" is output. Step 422 is also indicated with dashed lines to show that the step is optional, and different processing may be implemented or omitted altogether without departing from the scope and spirit of the invention. Processing then terminates in step 424.

Figure 5:
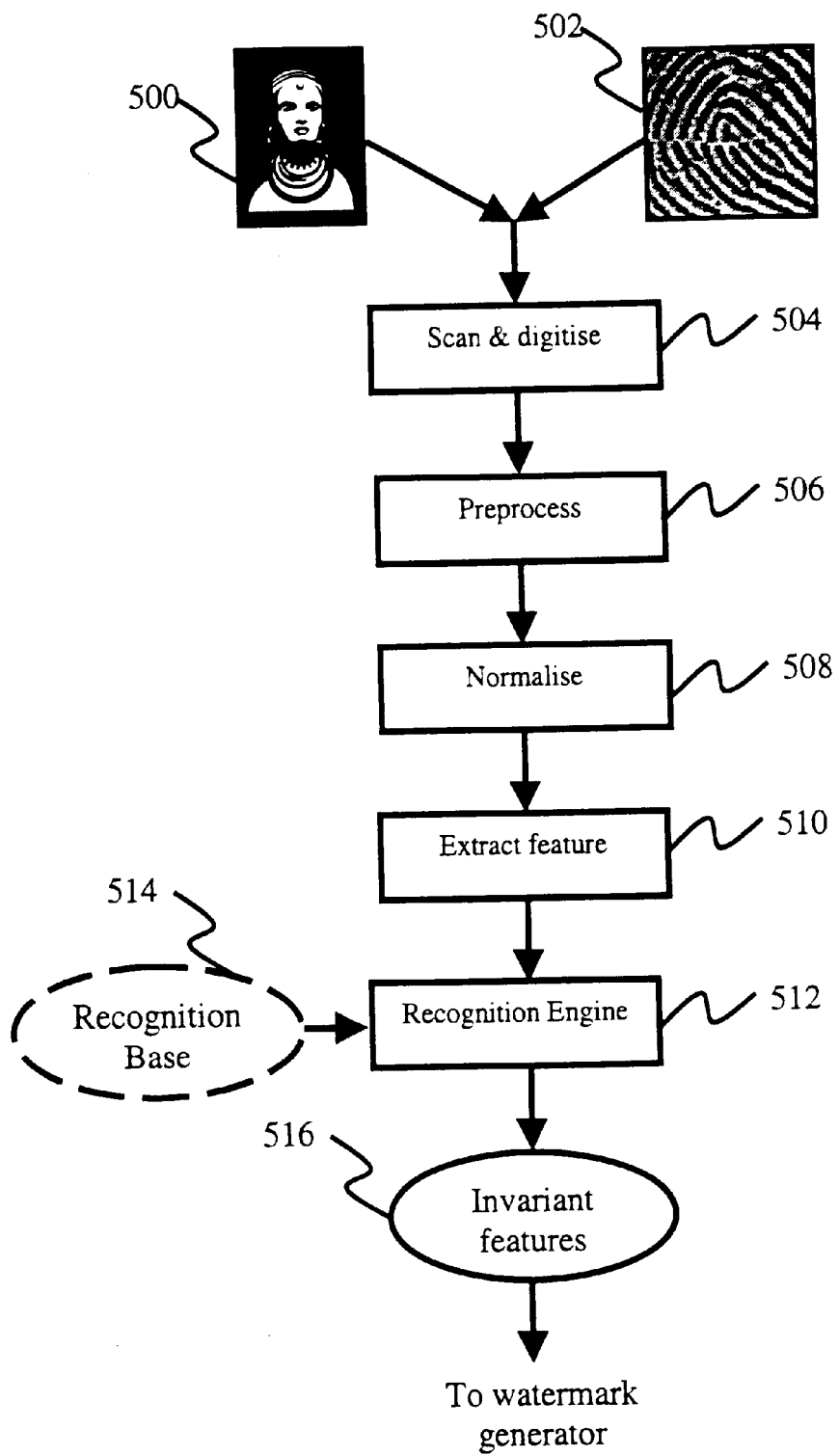
FIG. 5 is a flow diagram illustrating a typical method of extracting invariant biometric features, which may be practised in the methods of FIGS. 3 and 4.

FIG. 5 is a flow diagram illustrating an exemplary process of extracting invariant biometrics feature, which can be practised with the embodiments of the invention. Processing commences with the input of biometrics data, such as a person's facial image 500 or fingerprint, for example. Other types of biometrics data may be practised with the embodiments of the invention without departing from the scope and spirit of the invention. In step 504, the biometrics data (e.g. facial image 500 or fingerprint 502) is electronically scanned and digitised. Optionally, step 506 may be carried out if necessary to pre-process the digital data. This can involve filtering, or enhancing the data content, for example. Other conventional techniques of processing digital data can be practised without departing from the scope and spirit of the invention.

In step 508, the digital data (i.e. image) is normalised in both space and intensity based on predefined rules and landmarks. In step 510, one or more features are extracted from the normalised data. In step 512, recognition processing of the extracted features is carried out to identify invariant features. Any of a number of recognition methods can be practised. For some recognition methods, the recognition base 514 may be required as input to the recognition engine in step 512. For example, in a facial recognition system, an eigenface technique can be practised. The eigenfaces (recognition base) are previously produced by training facial samples. The invariant features can be determined by computing a projection of an input facial image onto the eigenfaces. As this is optional dependent upon the recognition method used, it is depicted using dashed lines. Finally, in step 512, the invariant biometrics features 516 are obtained using the recognition engine. The invariant features 516 can be output to the watermark generator. Normally, these features 516 have a size of a few hundred bytes.

Figure 6:
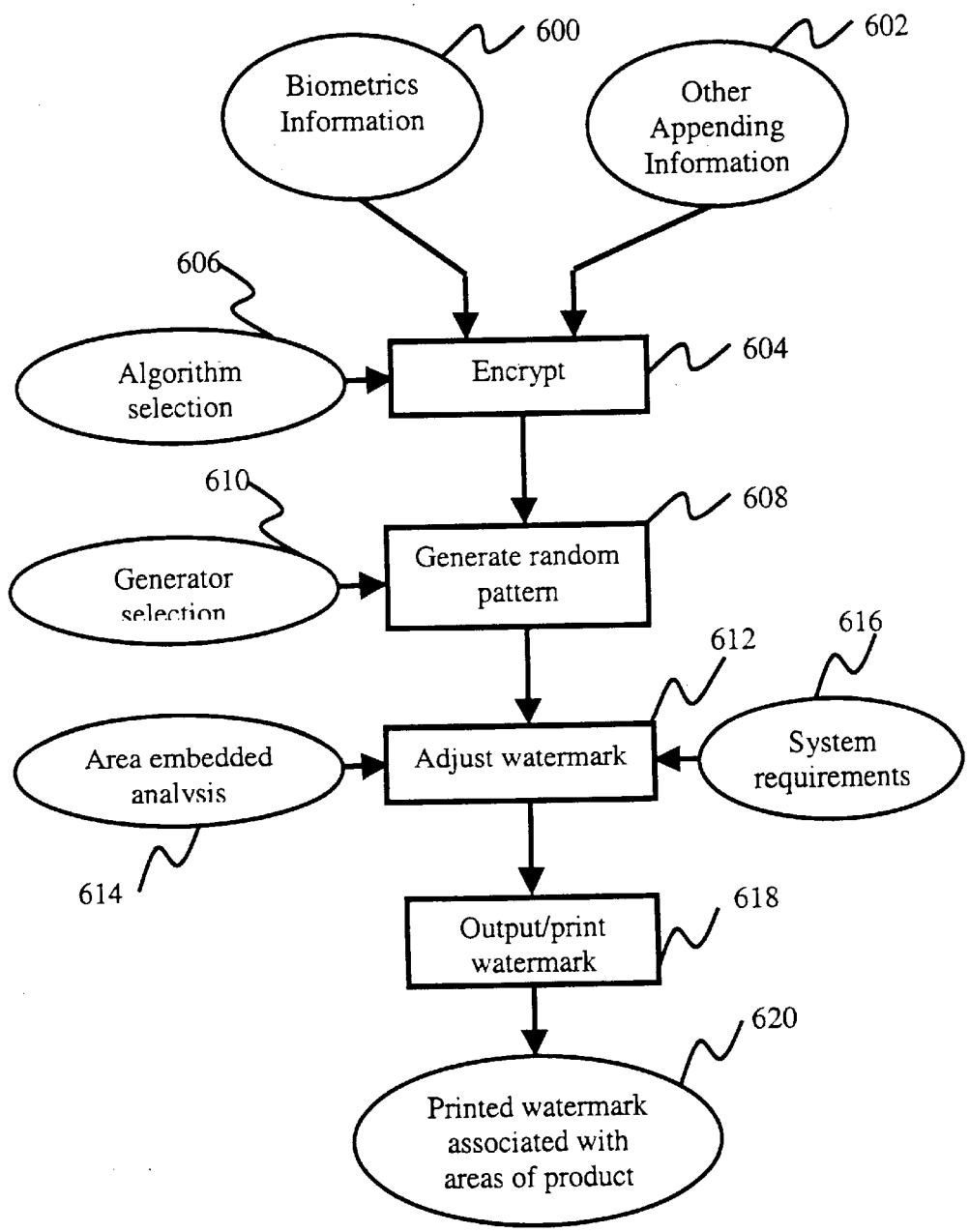
FIG. 6 is a flow diagram illustrating a typical method of generating a watermark, which may be practised in the methods of FIGS. 3 and 4.

FIG. 6 is a flow diagram illustrating a method of generating a watermark, which can be practised with the embodiments of the invention. Biometrics data or information 600 and other appending information 602 alone or together can be provided as input to the procedure. Such information is derived from a portion or working area of an article 100. In step 604, after the invariant biometric information and/or other appending information are obtained, the information is encrypted. Any of a number of encryption techniques can be practised without departing from the scope and spirit of the invention. The particular encryption technique is represented as the algorithm selection 606 that is provided as input to step 604. The encryption technique may be fixed or selected on the fly dependent on the data to be encrypted. Exemplary encryption techniques include secret mapping, hashing, and cryptographic methods such as those disclosed by Schneier, Bruce, *Applied Crotography: Protocols, Algorithms, and Source Code in C*, John Wiley & Sons, Inc., 1996. The selection of different algorithms can be controlled dependent upon particular applications and security requirement to increase overall security.

In step 608, a random pattern is generated based on a selected watermark generating mechanism 610. The selection can be done so that the random pattern is controlled or dependent upon the extracted message. Different random number generators can be chosen to increase overall security.

In step 612, a final watermark is formed dependent upon perceptual analysis 614 on the area to be embedded based on the Human Vision System (HVS). The strength of the watermark is also controlled by the requirements of the particular application or system requirements 616. Thus, step 612 adjusts the watermark generated in step 608 dependent upon the area embedded analysis 614 and system requirements 616. For example, by checking Discrete-Cosine Transform (DCT) or Fast Fourier Transform (FFT) components within a preselected block size, the content of the affected area can be roughly classified. A stronger or more noticeable watermark can be embedded in an area of high texture, and a weaker or less noticeable watermark can be embedded in a low texture or perhaps blank area.

In step 618, the adjusted watermark is printed, output or otherwise embedded in the assigned portion or working area. In this connection, FIGS. 1 and 2 illustrate the relationships between the generation of watermarks using data from one area and the embedding of the watermark in another area. The encryption used in the first embodiment is used not only for the purpose of concealment but also for the purpose of verification of the article or product 100. As biometric features and recognition/extraction techniques are known, those skilled in the art will appreciate that the selection and encryption of the extracted biometrics information 600 and other appended messages 602 are helpful to guarantee the security of watermark generators and the whole system. Meanwhile, the authentication is carried out using the encrypted selected message and extracted watermark. This is like verifying a digital signature.

The watermarking process and the corresponding watermark extraction process according to the first embodiment of the invention can be implemented in hardware or software form. The functionality of the processes can be implemented as electronic or software modules, the latter capable of being carried out using a computer. For example, the embodiment can be implemented as a computer program product. A computer program for protecting the legitimacy of an article can be stored on a computer readable medium. Likewise, the computer program can be one for verifying the legitimacy of an article. In each case, the computer program can be read from the medium by a computer, which in turn carries out the operations of the computer program. In yet another embodiment, the method depicted in FIG. 3 can be implemented as-an Application Specific Integrated Circuit (ASIC), for example. The methods are capable of being implemented in a number of other ways, which will be apparent to those skilled in the art in view of this disclosure, without departing from the scope and spirit of the invention.

Also, commercial printers and scanners can be used to practice the embodiments of the invention and satisfy the requirements of the system. For example, an HP Laser Jet 5 Printer offers true 600-dpi printing with resolution enhancement technology (RET), MicroFine toner, and 120 levels of grey of the smooth. A report on image quality tests of Primascan 5100 Greyscale Scanner, for example, points out that this scanner can achieve a greyscale range about 200 levels and a resolution about 500 dpi. Equipment of this type is readily available to the public. The foregoing is merely exemplary of the range-of products that can be used to practice the embodiments of the invention.

Second Embodiment

Figure 7:
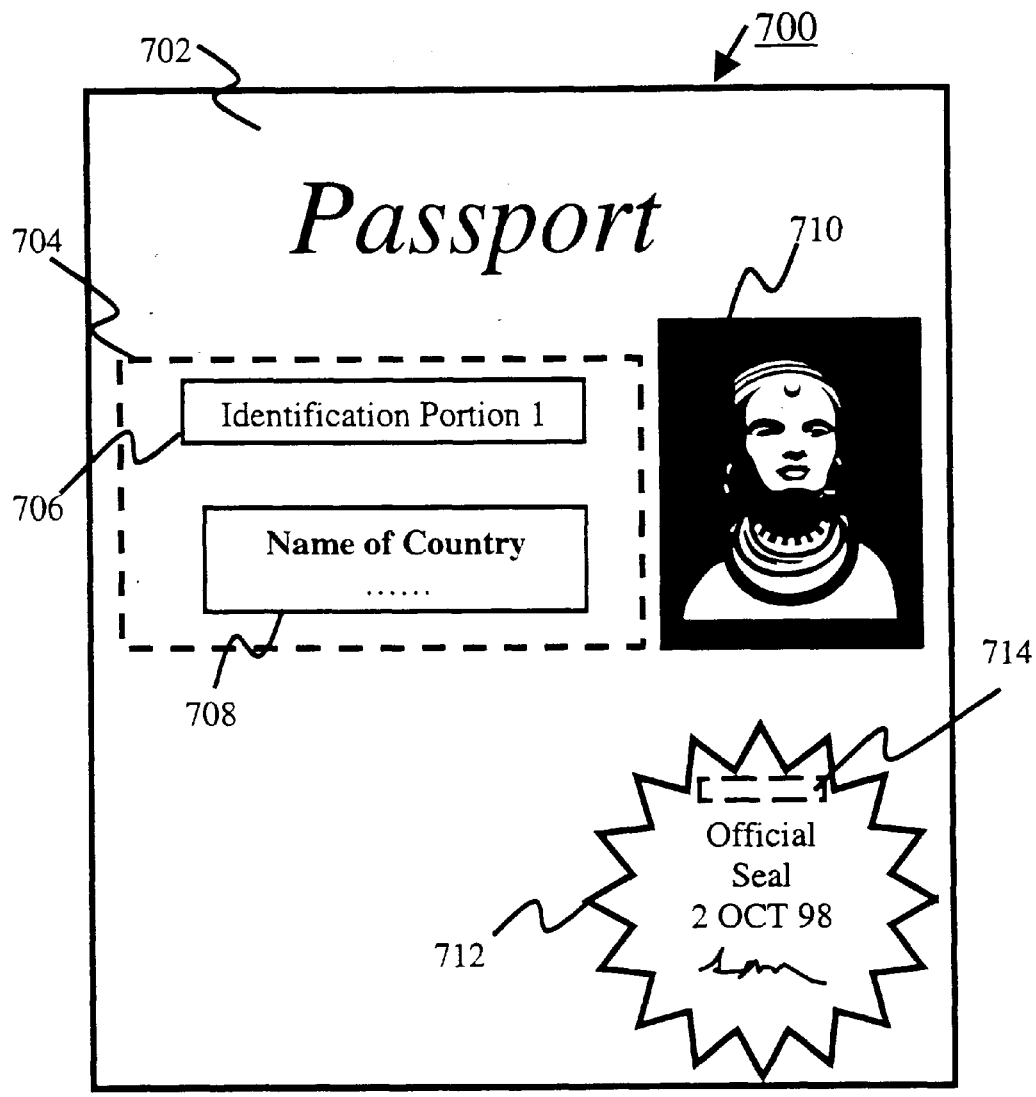
FIG. 7 is a block diagram illustrating an article according to the second embodiment of the embodiment.

FIG. 7 is a block diagram depicting an article 700 containing security information according to the second embodiment. The depicted exemplary article 700 is a passport. However, the article can be any of numerous products requiring protection against forgery, including a credit card, a bank note, a lottery ticket, a legal document, a driver's license, a birth certificate, etc. Embedding an invisible watermark in an official seal increases the verifiable authenticity of the article 700 requiring protection against forgery or any other unauthorised modification.

The passport 700 is depicted as a single sheet, or portion, 702. It includes an identification portion 704 and the name of country 708 in a first area 704 indicated by a dashed line. It also contains a facial image 710 of the passport holder. The "Name of Country" 708 can be extracted to form a watermark. Likewise, this can be done using the identification portion alone or with the name of the country. Also, the person's picture 710 can be used to form a watermark alone or with the other information. If the facial image 710 is used, invariant features of the facial image 710 are extracted using any of a number of techniques well known to those skilled in the art. The resulting extracted message (i.e., the name of the country 708, identification portion 706 and/or invariant extracted features of image 710) is encrypted. That is a digested or encrypted message is formed. This can be done using a hash function or other cryptographic technique. The encrypted message is then used to generate an invisible watermark.

To verify the passport as being properly issued, an official seal 712 is placed on the passport sheet 702. The exemplary seal 712 includes a marking indicating its official nature, the date it is embossed or embedded on the sheet, and the signature of the signing authorised person. Numerous other possibilities for seals exist, including those of a notary public, justice of the peace, a tax official, and the like. Preferably, the seal is an electronic one. A dashed-line portion 714 indicates that the watermark formed from the extracted message is embedded in the seal and is invisible. By embedding a watermark 714 within an official seal 712, it can be ensured that the document has been properly averred to or authorised and that its contents have not been changed and only contain the information that the authorising authority considered. In this manner, a certifiable official seal is provided.

Alternatively, a watermark can be embedded in the seal containing information about the authority alone or in combination with information described above. The invisible watermark authenticates and protects the owner of the seal that is applied. Only the authority has access to an unwatermarked copy of the seal. All other copies of the seal available to the public are embedded with an invisible watermark.

As described hereinbefore with reference to the first embodiment, the watermarking process and the corresponding watermark extraction process according to the second embodiment of the invention can be implemented in hardware or software form.

The foregoing embodiments of the invention provide an electronic seal of sorts, by which an electronic or printed document can be certified as authentic. In particular, articles providing protection against fraud forgery, and a method, an apparatus and a computer program product for protecting the legitimacy of an article have been described. A corresponding method, apparatus and computer program product have also been disclosed for verifying the legitimacy of an article. While only several embodiments have been set forth, it shall be apparent to those skilled in the art, in view of the disclosure herein, that numerous changes and/or modifications can be made without departing from the scope and spirit of the invention.

The claims defining the invention are as follows:

1. A method of embedding linked watermarks in an article requiring protection against forgery, said method including the steps of:
   extracting information from a first portion of said article;
   encrypting said extracted information from said first portion;
   generating a watermark using said encrypted information;
   rendering said watermark to a second portion of said article; and
   repeating the extracting, encrypting, generating and rendering steps with another portion of said article until all relevant information of said article has been processed and a cryptographic link is formed thereby.

2. The method according to claim 1, wherein said watermark is generated based on a selected watermark generating mechanism dependent upon said encrypted information.

3. The method according to claim 2, wherein each of said watermarks is generated based on different watermark generation mechanism.

4. The method according to claim 3, wherein seeds for generating a watermark are from only one portion of said article or several selected portions of said article.

5. The method according to claim 1, wherein said information is extracted directly from text.

6. The method according to claim 1, wherein said information is extracted from one or more invariant features of an image.

7. The method according to claim 6, wherein said image depicts biometric data of a person associated with the article.

8. The method according to claim 1, wherein said article is an electronic document.

9. An apparatus for embedding linked watermarks in an article requiring protection against forgery, said apparatus including:
   means for extracting information from a first portion of said article;
   means for encrypting said extracted information from said first portion;
   means for generating a watermark using said encrypted information;
   means for rendering said watermark to a second portion of said article; and
   means for repeating the extracting, encrypting, generating and rendering steps with another portion of said article until all relevant information of said article has been processed and a cryptographic link is formed thereby.

10. The apparatus according to claim 9, wherein said watermark is generated based on a selected watermark generating mechanism dependent upon said encrypted information.

11. The apparatus according to claim 10, wherein each of said watermarks is generated based on different watermark generation mechanism.

12. The apparatus according to claim 11, wherein seeds for generating a watermark are from only one portion of said article or several selected portions of said article.

13. The apparatus according to claim 9, wherein said information is extracted directly from text.

14. The apparatus according to claim 9, wherein said information is extracted from one or more invariant features of an image.

15. The apparatus according to claim 14, wherein said image depicts biometric data of a person associated with the article.

16. The apparatus according to claim 9, wherein said article is an electronic document.

17. A computer program product having a computer readable medium having a computer program recorded therein for embedding linked watermarks in an article requiring protection against forgery, said computer program product including:
   means for extracting information from a first portion of said article;
   means for encrypting said extracted information from said first portion;
   means for generating a watermark using said encrypted information;
   means for rendering said watermark to a second portion of said article; and
   means for repeating the extracting, encrypting, generating and rendering steps with another portion of said article until all relevant information of said article has been processed and a cryptographic link is formed thereby.

18. The computer program product according to claim 17, wherein said watermark is generated based on a selected watermark generating mechanism dependent upon said encrypted information.

19. The computer program product according to claim 18, wherein each of said watermarks is generated based on different watermark generation mechanism.

20. The computer program product according to claim 19, wherein seeds for generating a watermark are from only one portion of said article or several selected portions of said article.

21. The computer program product according to claim 17, wherein said information is extracted directly from text.

22. The computer program product according to claim 17, wherein said information is extracted from one or more invariant features of an image.

23. The computer program product according to claim 22, wherein said image depicts biometric data of a person associated with the article.

24. The computer program product according to claim 17, wherein said article is an electronic document.

25. An article requiring protection against forgery or fraud, said article including:
two or more portions for containing information, said information including text, biometric data, or both; and
two or more watermarks, each watermark printed in a respective one of said portions and being dependent upon information in a different portion, whereby a cryptographic link is formed between said two or more portions.

26. The article according to claim 25, wherein said article is an electronic document.

27. An article requiring protection against forgery or fraud, said article formed by the steps of:
extracting information from a first portion of said article, said article having two or more portions for containing information, said information including text, biometric data, or both;
encrypting said extracted information from said first portion;
generating a watermark using said encrypted information;
rendering said watermark to a second portion of said article; and
repeating the extracting, encrypting, generating and rendering steps with another portion of said article until all relevant information of said article has been processed so that two or more watermarks are formed, each watermark being rendered in a respective one of said portions and being dependent upon information extracted from a different portion, whereby a cryptographic link is formed between said two or more portions.

28. A method of forming an article requiring protection against forgery, said method including the steps of:
generating an invisible watermark dependent upon information contained in said article; and
rendering said watermark within an official seal placed on said article, said official seal being a securely controlled item of an authority.

29. The method according to claim 28, wherein said article is an electronic document.

30. The method according to claim 28, further including the steps of:
extracting information from a portion of said article; and
encrypting said extracted information.

31. The method according to claim 30, wherein said information is extracted directly from text.

32. The method according to claim 30, wherein said information is extracted from one or more invariant features of an image.

33. The method according to claim 32, wherein said image depicts biometric data of a person associated with the article.

34. An apparatus for forming an article requiring protection against forgery, said apparatus including:
means for generating an invisible watermark dependent upon information contained in said article; and
means for rendering said watermark within an official seal placed on said article, said official seal being a securely controlled item of an authority.

35. The apparatus according to claim 34, wherein said article is an electronic document.

36. The apparatus according to claim 34, further including:
means for extracting information from a portion of said article; and
means for encrypting said extracted information.

37. The apparatus according to claim 36, wherein said information is extracted directly from text.

38. The apparatus according to claim 36, wherein said information is extracted from one or more invariant features of an image.

39. The apparatus according to claim 38, wherein said image depicts biometric data of a person associated with the article.

40. A computer program product having a computer readable medium having a computer program recorded therein for forming an article requiring protection against forgery, said computer program product including:
means for generating an invisible watermark dependent upon information contained in said article; and
means for rendering said watermark within an official seal placed on said article, said official seal being a securely controlled item of an authority.

41. The computer program product according to claim 40, wherein said article is an electronic document.

42. The computer program product according to claim 40, further including:
means for extracting information from a portion of said article; and
means for encrypting said extracted information.

43. The computer program product according to claim 42, wherein said information is extracted directly from text.

44. The computer program product according to claim 42, wherein said information is extracted from one or more invariant features of an image.

45. The computer program product according to claim 44, wherein said image depicts biometric data of a person associated with the article.

46. An article requiring protection against forgery or fraud, said article including:
a portion containing information, said information including text, biometric data, or both;
an official seal placed on said article, said official seal being a securely controlled item of an authority; and
an invisible watermark dependent upon said information and being rendered within said official seal.

47. The article according to claim 46, wherein said article is an electronic document.

48. An article requiring protection against forgery or fraud, said article formed by the steps of:
generating an invisible watermark dependent upon information contained in said article, said information including text, biometric data, or both; and rendering said watermark within an official seal placed on said article, said official seal being a securely controlled item of an authority.

49. A method of verifying the legitimacy of an article against forgery, said method including the steps of:
   inputting said article as two or more portions;
   extracting at least one watermark from each portion;
   determining a watermark from information in each portion;
   comparing said extracted watermark from one portion with said determined watermark from a different portion to determine if a corresponding cryptographic link is found; and
   repeating said comparing step until all portions of said article have been processed, said article being verified as a legitimate article if all cryptographic links are found between said two or more portions.

50. The method according to claim 49, further including the steps of:
   scanning said product; and
   dividing said scanned product into two or more portions.

51. The method according to claim 50, further including the step of:
   scanning information from a portion of said product to reconstruct a seed to a generated watermark using a cryptographic technique carried out in a process of embedding a watermark in said portion.

52. The method according to claim 51, further including the step of:
   extracting an invariant feature from said scanned information to reconstruct said seed.

53. The method according to claim 52, wherein said extracted, invariant feature includes biometric data.

54. The method according to claim 51, further including the step of:
   decrypting said scanned information to reconstruct said seed.

55. The method according to claim 49, wherein a cryptographic link is a self-circle.

56. An apparatus for verifying the legitimacy of an article against forgery, said apparatus including:
   means for inputting said article as two or more portions;
   means for extracting at least one watermark from each portion;
   means for determining a watermark from information in each portion;
   means for comparing said extracted watermark from one portion with said determined watermark from a different portion to determine if a corresponding cryptographic link is found; and
   means for repeating said comparing step until all portions of said article have been processed, said article being verified as a legitimate article if all cryptographic links are found between said two or more portions.

57. The apparatus according to claim 56, further including:
   means for scanning said product; and
   means for dividing said scanned product into two or more portions.

58. The apparatus according to claim 57, further including:
   means for scanning information from a portion of said product to reconstruct a seed to a generated watermark using a cryptographic technique carried out in a process of embedding a watermark in said portion.

59. The apparatus according to claim 58, further including:
   means for extracting an invariant feature from said scanned information to reconstruct said seed.

60. The apparatus according to claim 59, wherein said extracted, invariant feature includes biometric data.

61. The apparatus according to claim 58, further including:
   means for decrypting said scanned information to reconstruct said seed.

62. The apparatus according to claim 56, wherein a cryptographic link is a self-circle.

63. A computer program product having a computer readable medium having a computer program recorded therein for verifying the legitimacy of an article against forgery, said computer program product including:
   means for inputting said article as two or more portions;
   means for extracting at least one watermark from each portion;
   means for determining a watermark from information in each portion;
   means for comparing said extracted watermark from one portion with said determined watermark from a different portion to determine if a corresponding cryptographic link is found; and
   means for repeating said comparing step until all portions of said article have been processed, said article being verified as a legitimate article if all cryptographic links are found between said two or more portions.

64. The computer program product according to claim 63, further including:
   means for scanning said product; and
   means for dividing said scanned product into two or more portions.

65. The computer program product according to claim 64, further including:
   means for scanning information from a portion of said product to reconstruct a seed to a generated watermark using a cryptographic technique carried out in a process of embedding a watermark in said portion.

66. The computer program product according to claim 65, further including:
   means for extracting an invariant feature from said scanned information to reconstruct said seed.

67. The computer program product according to claim 66, wherein said extracted, invariant feature includes biometric data.

68. The computer program product according to claim 65, further including:
   means for decrypting said scanned information to reconstruct said seed.

69. The computer program product according to claim 63, wherein a cryptographic link is a self-circle.

70. A method of verifying the legitimacy of an article against forgery, said method including the steps of:
   extracting at least one invisible watermark from an official seal, said official seal being a securely controlled item of an authority; and
   comparing said extracted watermark with verification information to determine if said extracted watermark matches said verification information indicating that said article is legitimate.

71. The method according to claim 70, wherein said verification information is information identifying said authority.

72. The method according to claim 70, further including the step of:

generating a watermark dependent upon information forming part of said article to provide said verification information.

73. The method according to claim 72, wherein said information forming part of said article is biometrics data.

74. The method according to claim 71, further including the step of:

decrypting said watermark.

75. An apparatus for verifying the legitimacy of an article against forgery, said apparatus including:

means for-extracting at least one invisible watermark from an official seal, said official seal being a securely controlled item of an authority; and means for comparing said extracted watermark with verification information to determine if said extracted watermark matches said verification information indicating that-said article is legitimate.

76. The apparatus according to claim 75, wherein said verification information is information identifying said authority.

77. The apparatus according to claim 75, further including:

means for generating a watermark dependent upon information forming part of said article to provide said verification information.

78. The apparatus according to claim 77, wherein said information forming part of said article is biometrics data.

79. The apparatus according to claim 76, further including:

means for decrypting said watermark.

80. A computer program product having a computer readable medium having a computer program recorded therein for verifying the legitimacy of an article against forgery, said computer program product including:

means for extracting at least one invisible watermark from an official seal, said official seal being a securely controlled item of an authority; and means for comparing said extracted watermark with verification information to determine if said extracted watermark matches said verification information indicating that said article is legitimate.

81. The computer program product according to claim 80, wherein said verification information is information identifying said authority.

82. The computer program product according to claim 80, further including:

means for generating a watermark dependent upon information forming part of said article to provide said verification information.

83. The computer program product according to claim 82, wherein said information forming part of said article is biometrics data.

84. The computer program product according to claim 81, further including:

means for decrypting said watermark.

* * * * *

UNITED STATES PATENT AND TRADEMARK OFFICE
CERTIFICATE OF CORRECTION

PATENT NO. : 6,748,533 B1
DATED : June 8, 2004
INVENTOR(S) : Jiankang Wu et al.

It is certified that error appears in the above-identified patent and that said Letters Patent is hereby corrected as shown below:

Title page,
Item [22], PCT Filed, "Jan. 30, 1999" should read -- Dec. 23, 1998 --.

Signed and Sealed this

Thirty-first Day of August, 2004

JON W. DUDAS
*Director of the United States Patent and Trademark Office*